Patented Aug. 19, 1930

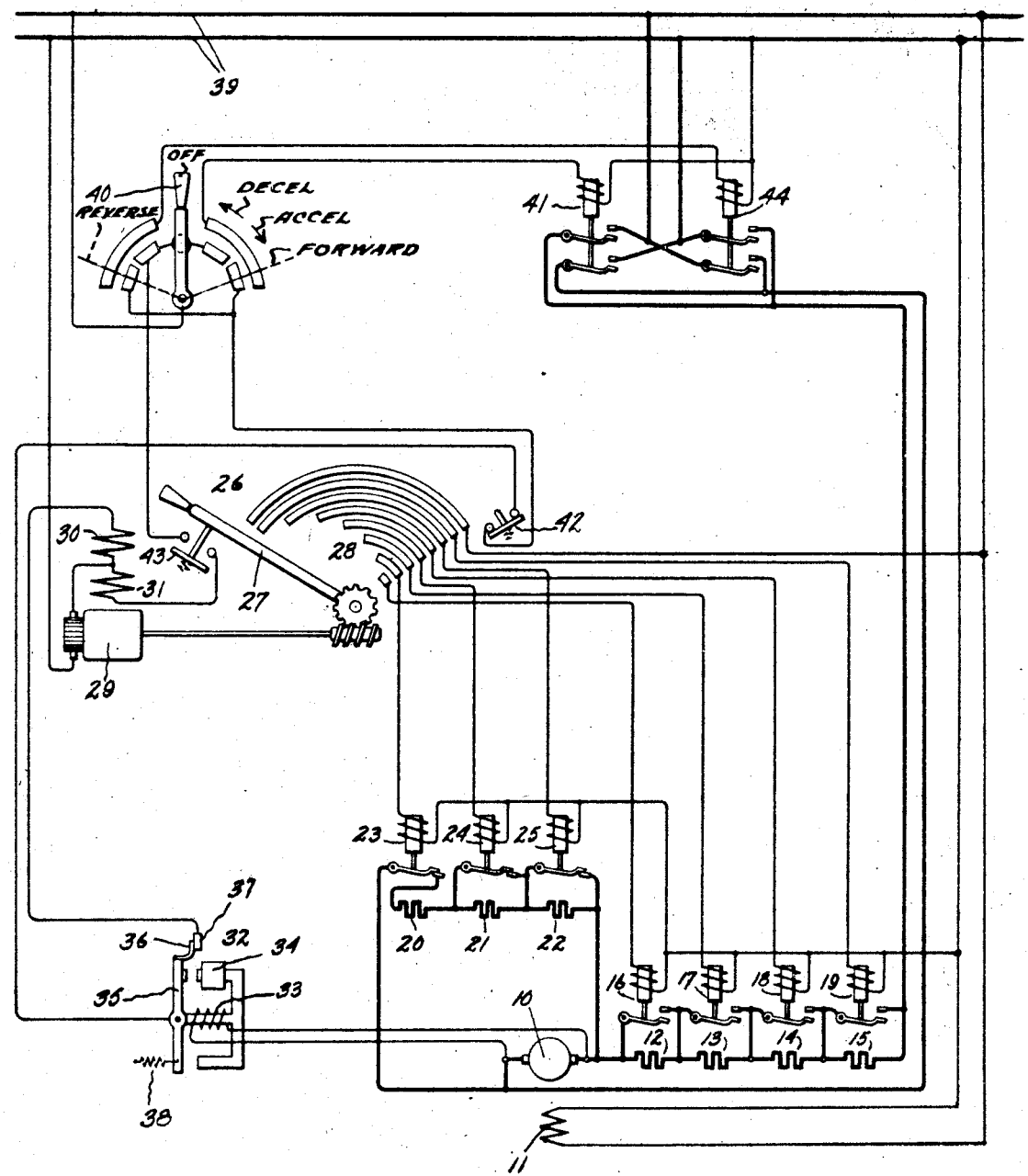

1,773,623

UNITED STATES PATENT OFFICE

BENJAMIN W. JONES, OF SCHENECTADY, NEW YORK, ASSIGNOR TO GENERAL ELECTRIC COMPANY, A CORPORATION OF NEW YORK

MOTOR-CONTROL SYSTEM

Application filed May 14, 1926. Serial No. 109,127.

My invention relates to improvements in systems of motor control whereby a speed variation of the motor may be effected on a time basis while conditions are suitable and the rate of speed variation may be automatically limited to take care of the conditions in which the speed variation effected by the means acting on a time basis is not suitable.

Although not necessarily limited thereto, the invention is particularly applicable to the control of an electric motor operating an elevator so as to prevent an excessive rate of acceleration. If a motor is accelerated from rest to full speed in a fixed time and maintains the same rate throughout then the rate of the motor speed acceleration is fixed The rate will vary as the time is varied. However, due to the overhauling action and the positive load action of elevators a uniform rate of operation of speed varying means does not result in a uniform rate of change of motor speed. If the rate is as high as can be allowed under one condition, then it will not be suitable for other conditions.

In accordance with my invention, the speed variation of the motor is ordinarily effected on a time basis and the action of the means acting on the time basis is automatically modified so as to take into account the variations in the conditions encountered which make a straight time element control unsuitable.

In carrying the invention into effect in a manner to explain the principles thereof, I provide speed varying means normally acting on a uniform time basis and automatically retard the action of said timing means in response to the rate of speed variation effected thereby. Thus, the acceleration of the motor normally proceeds on a time basis and too rapid acceleration is prevented in cases where the time basis acceleration would not function to produce the desired results.

For a more complete understanding of my invention, reference should be had to the accompanying drawing, the single figure of which illustrates in diagrammatic form a system of control embodying my invention.

In the system illustrated in the accompanying drawing, the means for obtaining speed variation of the controlled motor takes the form of a pilot motor operated switch for governing resistor controlling contactors and the means for modifying or arresting the action of the timing means takes the form of a normally closed electromagnetic switch having a winding thereon connected across the armature terminals of the motor so as to be energized in accordance with the counter electromotive force of the motor. This switch is of the type which is constructed and arranged so as to automatically open its contacts responsively to the rate of change of the energization of said winding. By this means, the acceleration of the controlled motor proceeds on a time basis while the conditions are right for time control and in case the acceleration effected thereby is too rapid, the electromagnetic switch will deenergize the pilot motor and thereby temporarily arrest further action thereof until the rate of change of the motor speed has decreased.

A more detailed explanation of the system disclosed in the accompanying drawing will now be given. The electric motor having an armature 10 and a shunt field 11 is arranged to drive any suitable load, as for example, an elevator. The resistor having a plurality of sections 12, 13, 14 and 15 is included in series relation in the circuit of armature 10. The contactors 16, 17, 18 and 19 are provided for shunting the resistor sections 12, 13, 14 and 15, respectively. A resistor having a plurality of sections 20, 21 and 22 is included in shunt relation with the armature 10. The normally closed contactors 23, 24 and 25 are provided for controlling the resistor sections 20, 21, 22, respectively, so as to vary the value of current shunted from the armature 10. The various resistor contactors are controlled by means of the pilot motor operated switch 26 which is provided with a rotatable switch member 27 arranged to make engagement with the segments 28 so as to energize the resistor contactors in a definite succession. The switch arm 27 is operated by means of the reversible pilot motor 29 which is provided with a split field winding, the portion 30 of which is provided for operation of the pilot motor in a direction to effect acceleration of the main driving motor and the portion 31 of which is provided for effecting a return of the switch arm 27 to the off position, that indicated in the drawing. The pilot motor 29 operates at a substantially constant speed. The pilot motor operated rheostat acting through the various resistor contactors and the resistor sections controlled thereby, provides a means for effecting speed regulation of the main driving motor on a definite time basis.

As before referred to, this speed variation on a time basis may not be suitable for all of the conditions encountered and to take care of conditions in which the speed variation effected by the means operating on a time basis proceeds at too rapid a rate, I have provided the normally closed electromagnetic switch 32, which has its principal winding 33 connected across the terminals of the armature 10 of the main driving motor. This switch is indicated as of the type disclosed in my United States Patent No. 1,703,486, February 26, 1929, which is assigned to the same assignee as this application. The magnetic structure of the switch is of E shaped form, with the winding 33 disposed on the middle leg thereof. A short circuited winding 34 is disposed on the upper leg of the magnetic structure and the magnetic member or armature 35 is pivotally mounted adjacent the middle leg on which the principal winding 33 is mounted. The armature 35 carries at its upper end a contact 36, which is arranged to make engagement with the stationary contact 37, and these contacts are normally held in engagement by means of the biasing spring 38 acting on the lower end of the armature 35.

In general, the operation of the switch 32 is as follows. While the energization of the winding 33 is a substantially constant value, the flux set up thereby in the E shaped magnetic structure will distribute between the two parallel paths in such a way that the armature 35 will remain in its biased position. One of these paths is through the middle and upper legs of the magnetic structure and the other of the paths is through the middle and the lower legs of the magnetic structure. These two parallel magnetic paths will be so nearly in balance that the biasing effect of the spring 38 will maintain the contacts 36 and 37 in engagement while the energization of winding 33 is a substantially constant value. However, if the energization of the winding 33 is increased at a rapid rate, as will be the case if the acceleration of the main driving motor is relatively rapid, and the rate of increase of the counter electromotive force of the main driving motor is correspondingly high, the flux distribution in the two paths of the magnetic structure of the switch will be changed, the flux through the lower path predominating over the flux through the upper path. This is because of the fact that the short-circuited winding 34 on the upper leg of the E shaped magnetic structure effects a retarding action on the building up of the flux through the upper of the two magnetic paths. The lower end of the armature 35 will then be attracted to the lower end of the E shaped magnetic structure of the switch against the biasing action of the spring 38, thereby opening the contacts 36 and 37 and deenergizing the pilot motor 29 so as to arrest temporarily further action of the timing means.

As thus constructed and arranged and with the parts in their respective position indicated in the drawing, it will be assumed that it is desired to connect the main driving motor to the source of supply 39 and accelerate the motor from rest to the full operating speed in accordance with the invention. The handle 40 of the master switch will be rotated clockwise into its first definite position, thereby energizing the direction contactor 41 and connecting the motor to the source of supply with the resistor sections 12, 13, 14 and 15 included in series relation with the motor armature and the resistor section 20 included in shunt to the motor armature 10. In order to effect further speed acceleration of the motor, the handle 40 will be moved further in a clockwise direction, thereby energizing the pilot motor 29 through a circuit including the limit switch 42, the switch contacts 36 and 37, the field winding 30 and the pilot motor armature to the source of supply. The pilot motor will now rotate at a substantially constant speed in such a direction that the switch arm 27 will be caused to rotate in a clockwise direction. This clockwise rotation of the switch arm 27 effected by the pilot motor will proceed on a definite time basis so as to accelerate the main driving motor. The contactor 19 will be first energized to shunt the resistor section 15, then the contactor 25 will be energized to open and include the resistor section 22 in shunt relation with the armature 10, the contactor 18 will then be energized to shunt the series resistor section 14, the contactor 24 will then be energized to open the shunt around the armature shunting resistor section 21, next the contactor 17 will be energized to shunt the series resistor section 13, then the contactor 23 will be energized to open and thereby open the circuit through the shunting resistors 20, 21 and 22, and finally the contactor 16 will be energized to shunt the series resistor section 12.

If the rate of acceleration effected through the operation of the pilot motor 29 operating on a time basis is at any time too high, the rate of increase of the counter electromotive force of the motor will be correspondingly high and the switch 32 will thus be caused to operate in the manner previously explained, so as to open the contacts 36 and 37 and thereby arrest temporarily the action of the pilot motor 29. When the rate of increase of the counter electromotive force of the motor, and thus the rate of acceleration of the motor, has decreased, the contacts of the switch 32 will be returned to their closed positions and the pilot motor automatically reenergized to continue the acceleration of the main controlled motor on a time basis. When the switch arm 27 of the pilot motor operated controller is in the full running position, the limit switch 42 will be opened thereby opening the circuit of the armature and field winding 30 of the motor 29 and further action of the pilot motor in this direction will be arrested.

When the handle 40 of the master switch is returned to the off position, the pilot motor is automatically energized from the source of supply through the limit switch 43 and the field winding 31 so as to automatically return the switch arm 27 to the position indicated in the drawing. When the handle 40 of the master switch is then turned in the counter clockwise direction to effect reverse operation of the main driving motor, the directional contactor 44 will this time be energized and the main driving motor will be accelerated in the reverse direction on a time basis, modified by the switch 32 in accordance with the rate of speed variation, in a manner similar to that above explained in connection with the acceleration of the main driving motor in the forward direction.

In accordance with provisions of the patent statutes, I have described the principle of operation of my invention, together with the apparatus which I now consider to represent the best embodiment thereof, but I desire to have it understood that the apparatus shown is only illustrative and that the invention can be carried out by other means.

What I claim as new and desire to secure by Letters Patent of the United States is as follows:

1. A motor control system comprising a motor, speed controlling means therefor comprising a resistor in the motor circuit, means including a pilot motor for varying the said resistor on a time basis, and an electromagnetic switch having a winding connected across the armature terminals of said motor and a magnetic movable member operated thereby in accordance with the rate of change of the counter electromotive force of the motor for deenergizing said pilot motor to limit the rate of speed variation of the motor.

2. A motor control system comprising a motor, a resistor in the circuit of said motor, a pilot motor for varying said resistor on a time bases, and means operated responsively to the rate of change of the counter-electromotive force of said motor for deenergizing said pilot motor to limit the rate of speed variation of said motor.

3. A motor control system comprising a motor, speed controlling means therefor comprising a resistor included in series relation in the armature circuit of said motor and a resistor included in shunt relation with the armature circuit of said motor, means including a pilot motor for varying said resistors on a time basis, and an electro-magnetic switch having a winding connected across the armature terminals of said motor and a magnetic movable member operated thereby in accordance with the rate of change of the counter-electromotive force of said motor for opening the operating circuit of said pilot motor to limit the rate of speed variation of said motor.

In witness whereof, I have hereto set my hand this 12th day of May, 1926.

BENJAMIN W. JONES.